United States Patent Office 3,033,822
Patented May 8, 1962

3,033,822
LINEAR POLYESTERS OF 1,4-CYCLOHEXANE-DIMETHANOL AND HYDROXYCARBOXYLIC ACIDS
Charles J. Kibler, Alan Bell, and James G. Smith, Kingsport, Tenn., assignors to Eastman Kodak Company, Rochester, N.Y., a corporation of New Jersey
No Drawing. Filed June 29, 1959, Ser. No. 823,298
19 Claims. (Cl. 260—47)

This invention relates to highly polymeric linear condensation polymers of at least three constituents as follows: 1,4-cyclohexanedimethanol (cis or trans isomers), a dicarboxylic acid and a hydroxycarboxylic acid. These polymers are valuable as fibers, films, molded articles, coating materials, etc. and are characterized by excellent overall properties including high melting temperatures, hydrolytic stability, etc.

This application is a continuation-in-part of Kibler et al. Ser. No. 554,639, filed December 22, 1955, now U.S. Patent No. 2,901,666, granted on August 25, 1959, wherein the claims cover polyesters generically as well as polyester-amides wherein one of the constituents is a diamine. Kibler et al. Ser. No. 823,296 filed on even date herewith covers polymers wherein one of the principal constituents is an aminoalcohol. Kibler et al. Ser. No. 823,-295 filed on even date herewith covers polymers wherein one of the principal constituents is an aminocarboxylic acid. Kibler et al. Ser. No. 823,297 filed on even date herewith covers relatively low molecular weight polymers, especially polyesters, which are useful as plasticizers, lubricants, etc. The specification and file history of the parent application discusses the prior art and the unobviousness of the subject matter of these inventions.

The properties of the polymers of the present invention include unexpectedly high melting temperatures, chemical stability, physical stability, dyeability, etc. More specific properties include weather resistance, resistance to heat distortion, hydrolytic stability which is an important factor in weathering, utility as a dielectric or as to other electrical properties under humid conditions, dyeability to deep shades without the use of a carrier, etc.

The objects of the present invention include providing polymers of the components mentioned above having the advantageous properties enumerated as well as products produced therefrom as described. Other objects will become apparent elsewhere herein.

According to a preferred embodiment of this invention polymers are provided which are linear highly polymeric condensation polymers of (A) at least one dibasic carboxylic acid, (B) at least one bifunctional dihydroxy compound and (X) at least one hydroxycarboxylic acid, the relative proportions of (A), (B) and (X) constituents being such as to constitute a linear polyester in which at least 50 mole percent of said component (B) consists of at least one member selected from the group consisting of the cis and trans isomers of 1,4-cyclohexanedimethanol, which polymer melts at above 100° C. and below about 330° C., has an inherent viscosity of at least 0.4 as measured in a mixture of 40% tetrachlorethane plus 60% phenol and is capable of being formed into fibers.

Generally the inherent viscosity of the polymers of this invention lies in the range of 0.4–2.0 although higher or lower values are also contemplated.

The bifunctional reactants or constituents which are employed to prepare the polymers of this invention contain no other reactive (functional) substituents which would interfere with the formation of linear polymers as defined by Carothers in his earlier work in this field. Such bifunctional reactants and the methods for preparing polymers from them are well known in the art and illustrated in numerous patents and in the literature as well as in the parent patent application of which this is a continuation-in-part.

As used in this specification the term 1,4-cyclohexane-dimethanol includes either or a mixture of both cis and trans isomers. The preferred usage is at least 50 percent of the trans isomer. The letters CHDM have the same meaning. A useful mixture of isomers is about 70% trans plus 30% cis.

Examples of the constituents which constitute the polymers of this invention include constituents designated above as (A), (B) and (X), with possible minor amounts but preferably none of (Y) and (Z) constituents as follows:

(A) DIBASIC CARBOXYLIC ACIDS

These include aromatic, aliphatic, heterocyclic and other types and include cycloaliphatic, acyclic, hexacarbocyclic, tetracarbocyclic, bicyclic, etc. Examples include terephthalic, cyclohexanedicarboxylic, succinic, naphthalenedicarboxylic, norcamphanedicarboxylic, carbonic, dimerized fatty acids, trimerized fatty acids, p-carboxycarbanilic, suberic, azelaic, adipic, sebacic, glutaric, dimethyl-malonic, $\alpha$-ethylsuberic, oxalic, $\alpha,\alpha$-diethyladipic, dicarboxy diethyl ether, ortho-phthalic, hexahydro-o-phthalic, sulfonyldipropionic, and many other acids. Examples of especially preferred hexacarbocyclic dicarboxylic acids wherein the carboxy radicals are attached to a hexacarbocyclic nucleus in para relationship include terephthalic acid, trans-1,4-cyclohexanedicarboxylic acid, p,p'-sulfonyldibenzoic acid, 4,4'-diphenic acid, 4,4'-benzophenonedicarboxylic acid and 1,2-di(p-carboxyphenyl) alkanes (1 to 10 carbons). Such acids as are contemplated by constituent (A) generally contain from about 1 to 40 carbon atoms.

(B) DIHYDROXY COMPOUNDS

These include aromatic, aliphatic, heterocyclic, and other types as in regard to constituent (A). Preferably the hydroxy radicals are attached to a methylene group as in a glycol, i.e., the compound is a dihydroxymethyl compound such as ethylene glycol, 1,10-decanediol, neopentyl glycol, 1,4 - bishydroxymethylbenzene, norcamphanedimethanol, etc. Oother dihydroxy compounds include hydroquinone, dihydroxynaphthalene, resorcinol, etc. Such compounds generally contain from 2 to 20 carbon atoms if they are monomeric in nature; however, the dihydroxy compounds contemplated also include the polyethylene glycols, other low polymers which are bifunctional and may contain internal ether, thioether, sulfone, carboxy, urethane and other linkages such as polystyrene which has been hydroxylated so as to acquire two hydroxy radicals. Any such polymeric dihydroxy compounds preferably have a molecular weight of less than 10,000, most preferably from about 700 to about 7500. Additional specific examples include 2-methyl-1,5-pentanediol, diethylene glycol, triethylene glycol, 2,2-dimethyl-3-isopropyl-1,3-propanediol, etc.

As already pointed out constituent (B) is composed of at least 50 mole percent of CHDM, whereby the advantageous results of this invention are accomplished.

(X) HYDROXYCARBOXYLIC ACIDS

These include aromatic, aliphatic, heterocyclic and other types as in regard to constituent (A) and include lactones. Specific examples include 2,2-dimethyl-3-hydroxypropionic acid, its cyclic lactone, pivalolactone, omega-hydroxycaproic acid, juniperic acid also known as omega-hydroxypalmitic acid, butyrolactone, 4-hydroxybutyric acid, 4-($\beta$-hydroxyethyl)-benzoic acid, 2-($\beta$-hydroxyethoxy)benzoic acid, 4-hydroxymethylbenzoic acid, 4-hydroxymethylcyclohexanecarboxylic acid, 4-($\beta$-hydroxyethoxy)-cyclohexanecarboxylic acid, etc. Generally these hydroxycarboxylic acids contain from 2 to 20 carbon atoms.

(Y) AMINOALCOHOLS

These include aromatic, aliphatic, heterocyclic and other types as in regard to constituent (A). Specific examples include 5-aminopentanol-1, 4-aminomethylcyclohexanemethanol, 5-amino-2-ethyl-pentanol-1, 2-(4-β-hydroxyethoxyphenyl)-1-aminoethane, 3-amino-2,2-dimethylpropanol, hydroxyethylamine, etc. Generally these aminoalcohols contain from 2 to 20 carbon atoms.

(Z) AMINOCARBOXYLIC ACIDS

These include aromatic, aliphatic, heterocyclic, and other types as in regard to constituent (A) and include lactams. Specific examples include 6-aminocaproic acid, its lactam known as caprolactam, omega-amino-undecanoic acid, 3-amino-2,2-dimethylpropionic acid, 4-(β-aminoethyl)benzoic acid, 2-(β-aminopropoxy)benzoic acid, 4-aminomethylcyclohexanecarboxylic acid, 2-(β-aminopropoxy)-cyclohexanecarboxylic acid, etc. Generally these compounds contain from 2 to 20 carbon atoms.

The molar proportions of the various constituents in the polymers of this invention are apparent to those skilled in the art. Generally speaking there are equal molar proportions of (1) the A constituent and (2) the sum of B and Y constituents. The sum total of the molar quantities of X, Y and Z are advantageously no greater than 60% of the molar amount of the A constituent; however, the Y constituent never exceeds the B constituent. According to the present invention constituent X is from about 10 to 50 mole percent of constituent A, the sum of constituents Y and Z is from 0 to 10 mole percent of constituent A and the molar amount of constituent B is reduced by the molar amount of constituent Y (if any).

The preparation of the polymers can be accomplished by melt phase or solid phase techniques as described in the parent application, in the prior art and in the examples below. The methods for forming fibers, film, molded products are similarly apparent.

This invention can be further illustrated by the following examples of preferred embodiments, although it will be apparent that these examples are included merely for purposes of illustration and are not intended to limit the scope of the invention unless otherwise specifically indicated.

Example 1

A 1-l. flask equipped with stirrer, nitrogen inlet, thermometer, and distilling head was charged with 116.4 g. (0.6 mole) of dimethyl terephthalate, 35 g. (0.4 mole) of pivalolactone, 247 g. (1.2 moles) of 1,4-cyclohexanedimethanol containing 30% methanol and 0.8 ml. of a 28.4% solution of titanium tetraisopropoxide in n-butanol. The mixture was stirred under nitrogen and heated at 120–130° C. for 1.5 hours. This low temperature was used to avoid loss of the relatively volatile pivalolactone. During this time, 127 ml. of methanol (from the 1,4-cyclohexanedimethanol solution) distilled. The temperature was raised to 200° C. and held there for one hour. Another 73 ml. of methanol distilled indicating completion of the alcoholysis stage of the reaction. The temperature was then raised to 280° C. over a twenty-minute period and a vacuum of less than 1 mm. of mercury applied for ten minutes. During this interval the excess diol was stripped off and the viscosity of the melt began to increase. This product was then blanketed with nitrogen and poured as rapidly as possible into water. The prepolymer so obtained was a translucent white brittle solid, viscosity 0.23 and M.P. 220–224° C. This prepolymer was ground in a hammer mill to pass a 40-mesh screen and heated at 0.07 mm. of mercury and 215–218° C. for six hours. The polymer had a viscosity of 0.69 and a M.P. of 240–245° C.

Example 2

This example was performed similar to that of Example 1 except that heating at 280° C. at a pressure of 0.2 mm. of mercury was continued for 90 minutes. The melt viscosity rapidly increased until finally the contents of the flask were largely hanging from the stirrer. The product, a slightly off-white hard resin, had a melting point of 235–240° C. and a viscosity of 0.75.

Either of these polymers of Example 1 or 2 was readily melt spun to fibers with excellent tenacity (2.5–4.0 g. per denier). A similar polyester was prepared using ethylene glycol instead of 1,4-cyclohexanedimethanol. Fibers from both polyesters were subjected to hydrolytic degradation, and it was found that fiber from the 1,4-cyclohexanedimethanol polyester retained its original properties longer than the corresponding composition using ethylene glycol.

Example 3

A 250-ml. flask equipped with a nitrogen inlet, stirrer and distilling head was charged with 38.8 g. (0.2 mole) dimethyl terephthalate, 8.6 g. (0.05 mole) methyl 4-hydroxymethylcyclohexanecarboxylate and 0.3 ml. of a 28.4% solution of titanium tetraisopropoxide in n-butanol. The flask was stirred under nitrogen and heated by a metal bath to 200° C. This temperature was maintained for 60 minutes during which time 2 ml. of methanol distilled. The residue was cooled and 51.3 g. (0.25 mole) of 1,4-cyclohexanedimethanol was added. The mixture was then reimmersed into the metal bath at 200° C. and held there for 30 minutes. During this time, 35 ml. of methanol distilled. The temperature was raised to 285° C. in 20 minutes, and a vacuum of 0.5 mm. of mercury applied for 10 minutes. At the end of this time, the melt was covered with a nitrogen atmosphere and the molten prepolymer poured into water. After drying and grinding to pass 40 mesh, the prepolymer was heated at 240° C. for 6 hours at a vacuum of 0.07 mm. of mercury. The product was a white solid; viscosity 0.83, M.P. 250–255° C. and could be formed into excellent fibers and film. It was melt spun into fibers which readily cold drew. The cold-drawn and heat-set fibers were strong, showed an excellent stability to hydrolysis and were more receptive to dyes than the unmodified polyester.

The following table summarizes other polyester compositions prepared by a procedure similar to that described in Examples 1 and 2.

| Example | Dibasic Acid | Moles of Dibasic Acid | Hydroxy Acid | Moles of Hydroxy Acid | Polymer I.V. | Polymer M.P. (° C.) |
|---|---|---|---|---|---|---|
| 4 | Terephthalic | 1.0 | 4-(β-hydroxyethoxy)-benzoic | 0.25 | 1.16 | 260–265 |
| 5 | trans-Hexahydroterephthalic.[1] | 1.0 | pivalolactone | 0.10 | 0.85 | 240–245 |
| 6 | 4,4'-Sulfonyldibenzoic | 1.0 | do | 0.50 | 1.36 | 200–210 |
| 7 | trans-Hexahydroterephthalic.[1] | 1.0 | 4-hydroxymethylcyclohexanecarboxylic | 0.10 | 0.80 | 235–240 |
| 8 | Terephthalic | 1.0 | 4-(β-hydroxyethoxy)-cyclohexanecarboxylic | 0.25 | 1.21 | 263–268 |

[1] Prepared by melt phase polymerization. All other examples were prepared by solid phase polymerization.

Polymers as described above were formed into fibers which could be oriented by stretching to improve their properties if desired, especially for textile fabrics. Similarly they can be extruded to form films which can be biaxially oriented. Such films have utility for photographic purposes, wrapping materials, dielectrics, etc. Molding compositions can also be prepared from such polymers. In any of these forms the polymers are receptive to dyes without carriers. They are especially resistant to weathering. An outstanding property is their hydrolytic stability in combination with an unusually well balanced group of other desirable properties.

Although the invention has been described in considerable detail with reference to certain preferred embodiments thereof, it will be understood that variations and modifications can be effected without departing from the spirit and scope of the invention as defined in the appended claims.

We claim:

1. A highly polymeric linear polyester of (A) a dicarboxylic acid, (B) a bifunctional dihydroxy component and (X) a mono-hydroxy-mono-carboxylic acid, the relative proportions of (A), (B) and (X) constituents being such that constituents (A) and (B) are present in equimolecular amounts, constituent (X) is from about 10 to 60 mole percent of constituent (A) and in which at least 50 mole percent of said constituent (B) consists of at least one member selected from the group consisting of the cis and trans isomers of 1,4-cyclohexanedimethanol, which polyester melts at above 100° C. and below about 330° C., has an inherent viscosity of at least 0.4 as measured in a mixture of 40% tetrachlorethane plus 60% phenol and is capable of being formed into fibers.

2. A polymer as defined by claim 1 wherein the constituents are: (A) is terephthalic acid, (B) is 1,4-cyclohexanedimethanol and (X) is 2,2-dimethyl-3-hydroxypropionic acid.

3. A polymer as defined by claim 1 wherein the constituents are: (A) is terephthalic acid, (B) is 1,4-cyclohexanedimethanol and (X) is 4-hydroxymethylcyclohexanecarboxylic acid.

4. A polymer as defined by claim 1 wherein the constituents are: (A) is terephthalic acid, (B) is 1,4-cyclohexanedimethanol and (X) is 4-($\beta$-hydroxyethoxy)-benzoic acid.

5. A polymer as defined by claim 1 wherein the constituents are (A) is trans hexahydroterephthalic acid, (B) is 1,4-cyclohexanedimethanol and (X) is 2,2-dimethyl-3-hydroxypropionic acid.

6. A polymer as defined by claim 1 wherein the constituents are (A) is trans hexahydroterephthalic acid, (B) is 1,4-cyclohexanedimethanol and (X) is 4-hydroxymethylcyclohexanecarboxylic acid.

7. A polymer as defined by claim 1 wherein the 1,4-cyclohexanedimethanol is from 50 to 100% trans isomer.

8. A polymer as defined by claim 7 wherein at least 50 mole percent of constituent (A) is a hexacarbocyclic dicarboxylic acid wherein the carboxy radicals are attached to a hexacarbocyclic nucleus in a para relationship.

9. A fiber of a polymer as defined by claim 1.
10. A fiber of a polymer as defined by claim 2.
11. A fiber of a polymer as defined by claim 3.
12. A fiber of a polymer as defined by claim 4.
13. A fiber of a polymer as defined by claim 5.
14. A fiber of a polymer as defined by claim 6.
15. A film of a polymer as defined by claim 1.
16. A film of a polymer as defined by claim 2.
17. A film of a polymer as defined by claim 3.
18. A film of a polymer as defined by claim 4.
19. A film of a polymer as defined by claim 5.

References Cited in the file of this patent

UNITED STATES PATENTS 2,901,466  Kibler et al. _____ Aug. 25, 1959